(12) United States Patent
Yasuda et al.

(10) Patent No.: US 11,429,132 B1
(45) Date of Patent: Aug. 30, 2022

(54) VEHICLE PEDAL CONFIGURATIONS AND SYSTEMS

(71) Applicant: Toyota Research Institute, Inc., Los Altos, CA (US)

(72) Inventors: Hiroshi Yasuda, San Francisco, CA (US); Manuel L. Kuehner, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 17/394,988

(22) Filed: Aug. 5, 2021

(51) Int. Cl.
*G05G 1/30* (2008.04)
*G05G 5/00* (2006.01)
(Continued)

(52) U.S. Cl.
CPC .............. *G05G 5/005* (2013.01); *B60K 26/02* (2013.01); *B60T 7/06* (2013.01); *G05G 1/40* (2013.01);
(Continued)

(58) Field of Classification Search
CPC .. G05G 1/30; G05G 1/32; G05G 1/36; G05G 1/38; G05G 1/40; G05G 1/405;
(Continued)

(56) References Cited

U.S. PATENT DOCUMENTS 3,354,743 A * 11/1967 Strauss ................... G05G 1/30
74/560
5,996,438 A 2/1999 Elton
(Continued)

FOREIGN PATENT DOCUMENTS

DE          3528351 A1 *  2/1987  ............. G05G 1/483
DE   202010007324 U1 * 10/2011  ........... B60K 26/021
(Continued)

OTHER PUBLICATIONS

Machine Translation of DE 20 2010 007 324, obtained Jan. 7, 2022.*
(Continued)

*Primary Examiner* — Richard W Ridley
*Assistant Examiner* — Brian J McGovern
(74) *Attorney, Agent, or Firm* — Dinsmore & Shohl LLP (57) ABSTRACT

Systems and device configurations are provided for reducing misstep, such as miscommunication between a vehicle and a driver that results in applying the incorrect pedal. Vehicle pedal configurations having a positioning element are described. Embodiments include pedal configurations having a pedal pad and at least one positioning element to adjust the pedal pad in response to pedal misstep. Pedal adjustment can include rotation of a pedal pad, rotation of portions of a pedal pad, and multibody pedal pad configurations. According to embodiment, a pedal pad includes vibrational elements to control vibration of the pedal. Embodiments are also directed to a pedal configuration including a flip plate. Systems are provided including a controller to control a pedal configuration and positioning elements. The controller may control the pedal based on a driving mode, such as an assistive driving state wherein operator is instructed to apply a pedal.

15 Claims, 4 Drawing Sheets

(51) Int. Cl.
  *B60K 26/02* (2006.01)
  *G05G 1/40* (2008.04)
  *G05G 1/44* (2008.04)
  *B60T 7/06* (2006.01)
(52) U.S. Cl.
  CPC .......... *G05G 1/44* (2013.01); *B60K 2026/026* (2013.01); *G05G 2505/00* (2013.01)
(58) Field of Classification Search
  CPC  G05G 1/44; G05G 1/445; G05G 1/48; G05G 5/005; G05G 5/28; G05G 2505/00; B60K 26/02; B60K 2026/026; B60K 2026/024; B60K 2026/023; B60K 2026/022; B60K 2026/021; B60T 7/06; B60T 7/04; B60R 25/003; B60R 25/005; B60N 3/06; B60N 3/063
  See application file for complete search history.

(56) References Cited

U.S. PATENT DOCUMENTS

| | | | |
|---|---|---|---|
| 7,696,863 B2 | 4/2010 | Lucas et al. | |
| 7,714,701 B2 | 5/2010 | Altan et al. | |
| 7,798,578 B2 | 9/2010 | Lewis et al. | |
| 10,392,029 B2 | 8/2019 | Moia et al. | |
| 10,564,663 B2 | 2/2020 | Krehl et al. | |
| 10,889,226 B1 * | 1/2021 | Dean | B60T 7/06 |
| 10,946,741 B1 * | 3/2021 | Kim | B60T 7/06 |
| 10,994,611 B1 * | 5/2021 | Kim | G05G 5/28 |
| 11,021,058 B1 * | 6/2021 | Kim | G05G 5/28 |
| 2003/0233902 A1 * | 12/2003 | Hijikata | G05G 1/30 74/513 |
| 2008/0084110 A1 * | 4/2008 | Suzuki | B60T 8/1755 303/146 |
| 2008/0174415 A1 * | 7/2008 | Tanida | B62D 15/029 340/438 |
| 2014/0298949 A1 * | 10/2014 | Brown | G05G 1/40 74/513 |
| 2017/0341648 A1 * | 11/2017 | San | B60W 50/14 |
| 2018/0232002 A1 * | 8/2018 | Brown | B60W 50/16 |
| 2019/0064870 A1 * | 2/2019 | Krehl | B60Q 9/00 |
| 2021/0170988 A1 * | 6/2021 | Villalva Sanchez | B60R 21/09 |

FOREIGN PATENT DOCUMENTS

| | | | |
|---|---|---|---|
| EP | 1486847 B1 | 4/2007 | |
| JP | 3948463 B2 | 7/2007 | |
| JP | 2011162176 A | 8/2011 | |
| WO | WO-2016055202 A1 * | 4/2016 | ........... B60K 26/021 |

OTHER PUBLICATIONS

Machine Translation of WO 2016/055202, obtained Jan. 7, 2022.*
Machine Translation of DE 3528351, obtained Jan. 7, 2022.*

* cited by examiner

VEHICLE PEDAL CONFIGURATIONS AND SYSTEMS

TECHNICAL FIELD

Embodiments described herein generally relate to vehicle control pedals and, more specifically, to vehicle pedal configurations to control misstep of a vehicle pedal.

BACKGROUND

The driver of a vehicle controls lateral and longitudinal movement using a steering control and vehicle pedals. In manually driven or partly automated vehicles, the driver controls the vehicle's longitudinal movements with a brake pedal for deceleration and a gas pedal for acceleration. To instruct the driver to accelerate or decelerate, the vehicle may provide a visual/auditory warning. However, the instructions are useful only if the driver is aware of the command and if the driver applies the appropriate pedal. A driver may press an incorrect pedal in response to a driving instruction due to multiple factors, including for example, misrecognition of the pedal (e.g., confusing the brake pedal for the gas pedal) and/or misinterpretation of the instruction (e.g., confusing an instruction to decelerate for an instruction to accelerate). There exists a need and a desire for improved feedback systems for longitudinal control of vehicles which prevents or mitigates pedal missteps and misapplications.

SUMMARY

Systems and pedal configurations are described. According to embodiments, a vehicle pedal configuration includes a pedal pad having a surface and at least one positioning element configured to adjust the surface of the pedal pad in response to pedal misstep.

In one embodiment, the pedal pad is coupled to a pedal arm, and wherein the at least one positioning element is configured to prevent engagement of the pedal pad.

In one embodiment, the pedal pad is configured to rotate.

In one embodiment, the pedal pad includes a multibody structure having plurality of pad elements, wherein adjusting the pedal pad includes rotation of at least one pedal pad element.

In one embodiment, rotation of at least one pedal pad element includes rotation in one of a vertical and a horizontal direction relative to a pedal arm.

In one embodiment, the at least one positioning element vibrates the pedal pad and surface horizontally to reposition a driver foot.

In one embodiment, pedal pad includes a flip plate, wherein the flip plate rotates relative to a pivot axis.

In one embodiment, the surface of the pedal pad includes plurality of projections, and wherein at least one source is configured to vibrate the plurality of projections to laterally displace a driver foot from the surface.

In another embodiment, a vehicle system includes a pedal configuration including a pedal pad having a surface, and at least one positioning element configured to adjust the pedal pad in response to pedal misstep. The vehicle system also includes a controller configured to control the positioning element.

In one embodiment, the operator device is at least one of footwear including a sole, the sole including ferromagnetic material, and a wearable device including a ferromagnetic material.

In one embodiment, the pedal is at least one of a vehicle accelerator pedal and a vehicle brake pedal.

In one embodiment, the pedal pad is coupled to a pedal arm, and wherein the at least one positioning element is configured to prevent engagement of the pedal pad.

In one embodiment, the pedal pad is configured to rotate.

In one embodiment, the wherein the pedal pad includes a multibody structure having plurality of pad elements, wherein adjusting the pedal pad includes rotation of at least one pedal pad element.

In one embodiment, rotation of at least one pedal pad element includes rotation in one of a vertical and a horizontal direction relative to a pedal arm.

In one embodiment, the at least one positioning element vibrates the pedal pad and surface horizontally to reposition a driver foot.

In one embodiment, pedal pad includes a flip plate, wherein the flip plate rotates relative to a pivot axis.

In one embodiment, the surface of the pedal pad includes plurality of projections, and wherein at least one source is configured to vibrate the plurality of projections to laterally displace a driver foot from the surface.

In one embodiment, the vehicle system includes a plurality of actuators configured to activate the at least one positioning element.

In one embodiment, the controller is configured to control the positioning element when an operator action does not match vehicle action.

In one embodiment, the vehicle system also includes a sensor configured to detect driver foot position, wherein the controller is configured to control the positioning element using sensor output.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for vehicles including pedal configurations for vehicle control. Pedal configurations may be provided for vehicle accelerator pedals and vehicle brake pedals to prevent misstep. Configurations can also provide for a pedal pad coupled to a pedal arm such that the at least one positioning element is configured to prevent engagement of the pedal pad. Embodiments include processes for controlling pedal pad. The systems and methods for controlling a pedal configurations will be described in more detail, below.

Pedal misstep can lead to accidents and vehicle damage. Unlike conventional vehicle pedal configurations which do not provide feedback and do not allow for control of pedal misstep, pedal configurations and vehicle systems are provide to minimize or prevent pedal misstep. In addition to pedal misstep, configurations and systems are provided that aid a driver of a vehicle during assisted driving. Unlike conventional pedal controls that do not provide driver feedback, embodiments provide solutions when pedal misstep is not in line with a vehicle directed control. Embodiments of the present disclosure include pedal configurations that can reduce miscommunication between the vehicle and the driver in applying the incorrect pedal. According to embodiments, a pedal configuration configured to apply a rotational movement to a pedal pad can correct an improper foot placement. As discussed herein, rotation may be relative to a vertical axis or a horizontal axis. Embodiments are provided for multibody pedal pads which can provide rotation among multiple axes. Rotation may be controlled by vehicle systems as described for removal of a driver foot. According to other embodiments, pedal configurations can include one or more of vibration, flip plates and pedal treads. Embodiments can provide a pedal configuration including a direction surface wherein a foot may be moved by vibration of the pedal and one or more elements protruding from the pedal.

According to embodiments, a pedal configuration may apply a rotational movement to correct an improper foot placement. As such, rotation can deliver information, as a haptic output to a driver, an in particular the driver foot, to indicate that the foot is on the wrong pedal. The feedback can also indicate the direction the driver foot needs to be moved to arrive at a recommended or directed pedal. Rotation and other configurations provided herein may also allow the pedal to physically move a driver foot away from the pedal to reduce acceleration of the vehicle in situations where the driver is unresponsive.

Embodiments provide solutions for vehicle systems that assist drivers and for notification of driver controls. In addition, embodiments described herein can solve potential issues of pedal misstep. By way of example, vehicle systems may notify or instruct a driver to accelerate or decelerate as part of an assistive driving scenario. Embodiments provide a solution to prevent a misstep during an assistive driving scenario, such as application of an accelerator pedal when the vehicle instructs a driver to apply the brake pedal. Unlike vehicle systems that only provide a visual/auditory notification to the driver, configurations can detect a driver foot and control a pedal configuration. Detection of a misstep as described herein may use vehicle instructions to determine if a driver's foot is on the appropriate or incorrect pedal. Systems and configurations can detect and intervene in multiple scenarios, such as when a driver incorrectly presses a pedal in response to a driving instruction, misrecognition of a pedal by a driver (e.g., confusing the brake pedal for the gas pedal), and misinterpretation of the instruction (e.g., confusing an instruction to decelerate for an instruction to accelerate). In addition, systems and configurations described herein may provide configurations that allow the vehicle to provide feedback and prevent misstep when driver actions may present a safety issue. By way of example, detection of an incoming obstacle may be grounds for the vehicles to prevent misstep of an accelerator pedal or a brake pedal to avoid an accident.

Embodiments of the disclosure are also directed to components of a vehicle and vehicle systems in part that can control pedal configurations discussed herein.

Figure 1:
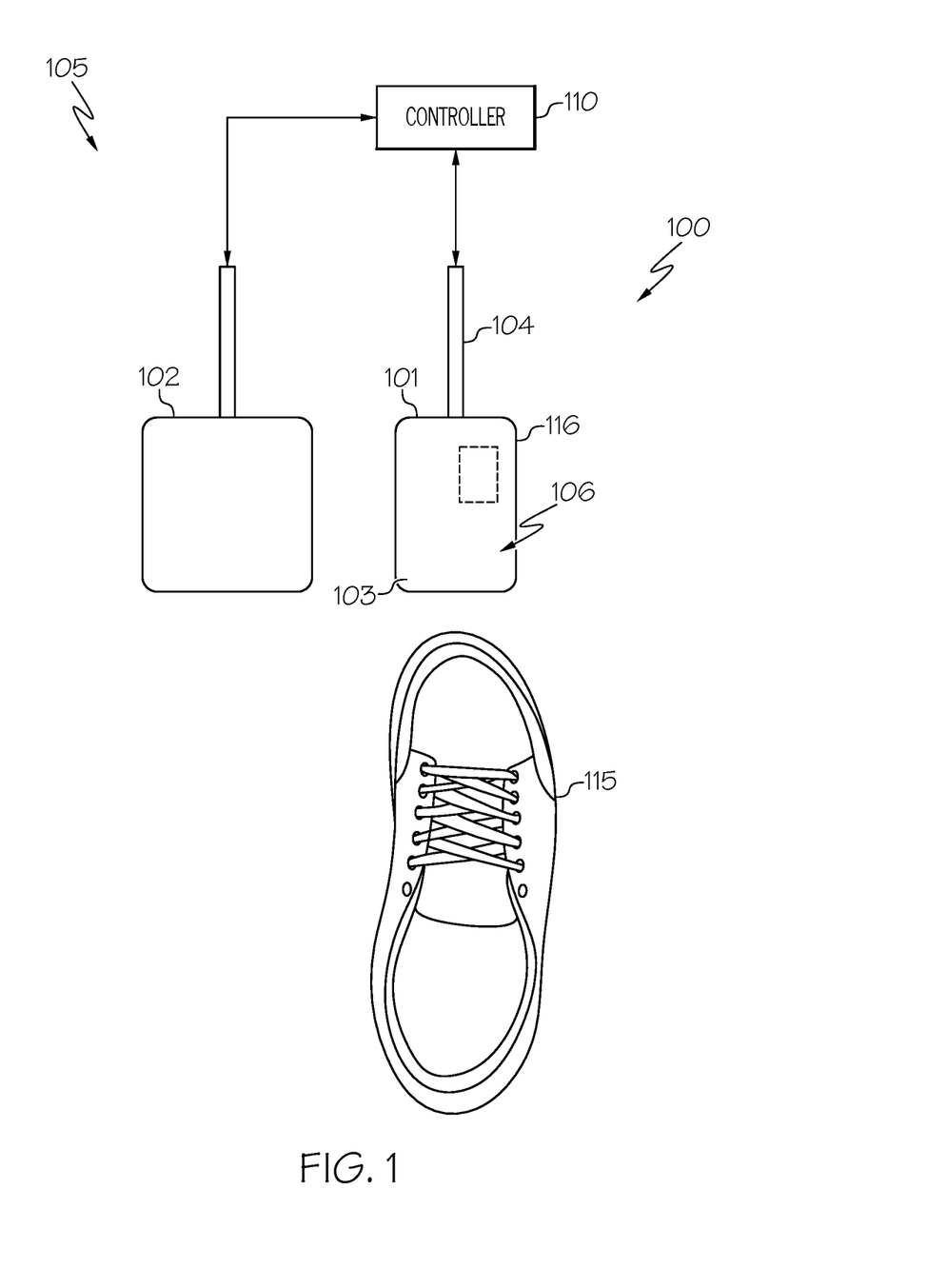
FIG. 1 depicts an example pedal configuration and example vehicle system, according to one or more embodiments described herein.

Referring now to the drawings, FIG. 1 depicts a pedal configuration 100 for a vehicle, according one or more embodiments. Pedal configuration 100 includes at least one pedal, such as pedal 101, and at least one at least one positioning element. Pedal 101 includes pedal pad 103 and surface 106. Pedal pad 101 may be coupled to pedal arm 104. According to embodiments, pedal configuration 100 includes at least one positioning element configured to adjust the surface 106 of the pedal pad 103 in response to pedal misstep. The at least one positioning element may also be configured to prevent engagement of pedal pad 103 during a misstep. According to embodiments, the at least one positioning element may be a component of pedal 101. By way of example, embodiments described herein for pedal 101 can include mechanical features such as a rotatable foot pad, foot pad flip plate, and anti-slip pad. Embodiments of pedal 101 can also include directional oscillation and movement of foot pad 103. Rotation of pedal pad 103 may be relative to peal arm 104. Pedal configuration 100 may be configured to prevent misstep of a driver foot 115. Prevention of pedal misstep may be provided by the at least one positioning element adjusting the surface 106 of pedal pad 103 in response to pedal misstep. Pedal configuration 100 can include one or more mechanical and electrical elements for the at least one positioning element position element. According to embodiments, pedal pad 103 may include a unibody configuration. According to other embodiments, pedal pad may include a multibody configuration.

Pedal configuration 100 may include additional pedals, such as pedal 102. According to embodiments, pedal 101 may be an accelerator pedal and pedal 102 may be a brake pedal. Pedal configuration may optionally include sensor 116 to detect at least one of presentence and contact of driver foot 115. Optional sensor 116 may be one or more of a contact sensor, capacitive sensor, infrared (IR) sensor, and sensor in general to detect driver foot 115.

According to embodiments, prevention of misstep may direct driver foot 115 away from pedal 101 or pedal 102. By way of example driver foot 115 may be directed towards another pedal, such as pedal 102. According to embodiments, pedal configuration 100 may be configured to notify a driver of pedal misstep. As a result, pedal configuration may direct driver foot 115 toward another pedal, provide feedback, and or prevent driver foot 115 from engaging pedal 101.

According to embodiments, pedal configuration 100 may be part of a vehicle system 105 including a controller 110. Vehicle system 105 may be configured to control pedal configuration 100. Controller 110 may be configured to provide at least one function for an assistive driving operations of a vehicle. Controller 110 may be configured to control pedal configuration 100 and the at least one positioning element of pedal 101. By way of example, in a driving scenario where objects are detected near a vehicle, the vehicle may determine that application of an accelerator pedal would result in a collision. As such, controller 110 may activate pedal configuration 100 to prevent contact with an accelerator pedal, such as pedal 101. Activation of pedal configuration 101 may result in the at least one positioning element of pedal 101 to prevent and/or deter activation of pedal 101 by driver foot 115. Similarly, in an assistive driver state controller 115 may prevent activation of an accelerator pedal, such as pedal 101, when the vehicle determines that reduced speed is necessary.

Vehicle system 105 may be configured to notify a driver that the driver foot 115 is on the wrong pedal. FIGS. 2-7 illustrate embodiments for control of pedal configuration 100. According to embodiments, pedal configuration 100 includes pedal 101 configured to apply a rotational movement to correct an improper foot placement, such as rotation of the pedal pad 103 relative to a vertical axis which can include removal of a driver foot 115. According to other embodiments, pedal configuration 100 includes pedal 101 configured to generate oscillations for lateral movement of pedal pad 103. According to embodiments, pedal configuration 100 includes pedal 101 having a flip plate, wherein vibration of the pedal is performed to rotate the flip plate about an axis to remove a driver foot 115. According to other embodiments, pedal configuration 100 includes a direction friction surface to move driver foot 115 by vibration of the pedal 101. FIG. 6 illustrates a direction friction surface providing easier movement in one direction and more difficult movement in the opposite direction.

Figure 2:
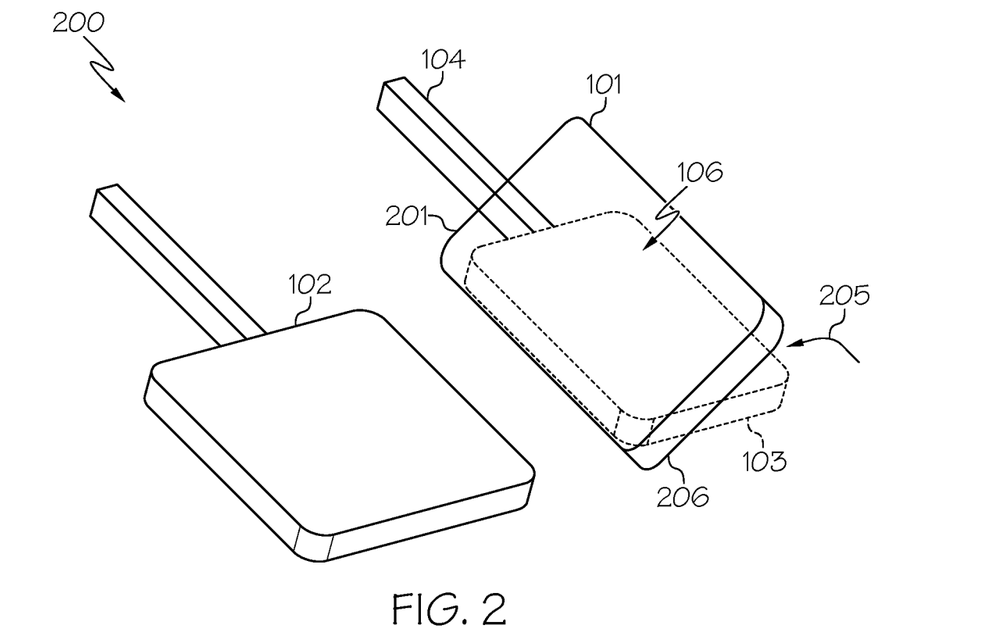
FIG. 2 depicts a pedal configuration configured to rotate, according to one or more embodiments described herein.

FIG. 2 depicts a pedal configuration 200 configured to rotate. According to embodiments, pedal 101 is coupled to pedal arm 104 with a rotatable joint 201 configured to rotate pedal pad 103 such that pedal surface 106 is rotated as shown by direction 205. Rotatable joint 201 may be configured to maintain pedal 101 in a first position for use of pedal 101 as an accelerator pedal and to rotate to at least a second position 206 as shown by direction 205. According to embodiments, rotatable joint 201 may couple pedal 101 to pedal arm 104. Rotatable joint 201 may connect to at least one of a top surface and bottom surface of pedal pad 103. According to embodiments, pedal pad 103 includes a unibody structure. Rotation of pedal 101 tilts surface 106 during rotation to provide feedback to a driver foot and notify a driver that a foot is on the wrong pedal. Rotation may include rotating from a first fixed position to a second titled position as shown in FIG. 2. According to embodiments, rotation shown in FIG. 2 may include rotation of pedal 101 along a longitudinal axis toward the direction of a correct pedal. Rotation in FIG. 2 is shown along a central access of pedal pad 103, however it should be appreciated that embodiments may be configured for rotation along one or more vertical or longitudinal axes of pedal pad 103. According to other embodiments, rotation of a pedal pad 103 may be performed along one or more horizontal or latitudinal axes. Axes of rotation for a pedal are shown in FIG. 3.

Figure 3:
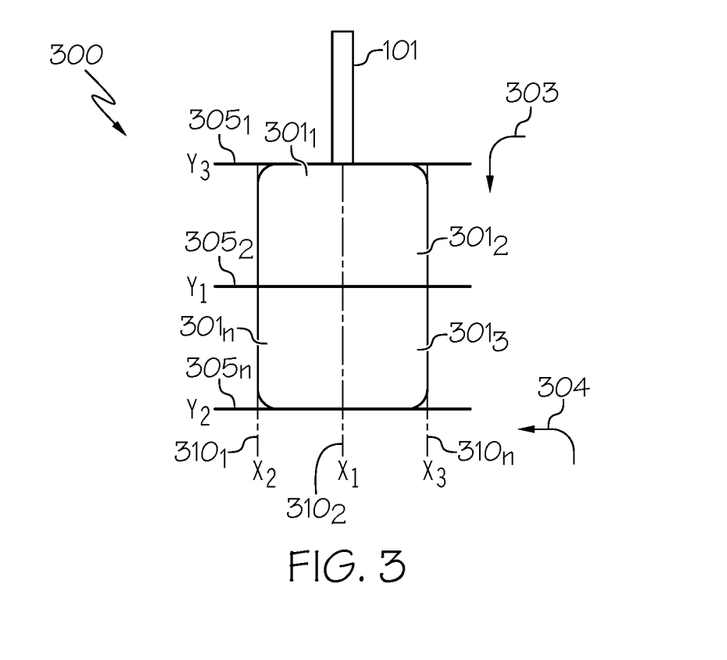
FIG. 3 depicts another pedal configuration and pedal configuration rotation axes, according to one or more embodiments described herein.

FIG. 3 depicts pedal configuration 300 and exemplary axes of rotation according to embodiments. According to embodiments, pedal 101 may be controlled to rotate about a vertical axis. FIG. 3 illustrates exemplary axes of rotation $305_{1-n}$ for horizontal rotation in direction 303 and axes $310_{1-n}$ for vertical rotation in direction 304. Pedal 101 may have a unibody configuration in which the entire pedal pad rotates relative to the axis. According to other embodiments, a pedal pad of pedal 101 may include a multibody configuration or multibody structure having a plurality of parts $301_{1-n}$. In a multibody configuration, portions of the pedal pad may rotate or removable engage. In a multibody structure, pedal 101 can include a plurality of pad elements, where adjusting pedal pad includes rotation of at least one pedal pad element. By way of example, with vertical or longitudinal rotation relative to axes $310_{1-n}$ portions $301_1$ and $301_n$ may rotate down in direction 304 such that a driver foot falls away from the surface of pedal 101. Similarly, with horizontal rotation relative to axes $305_{1-n}$ portions $301_2$ and $301_n$ may rotate down in direction 303 such that a driver foot falls away from the surface of pedal 101. Representations of axes of rotation $305_{1-n}$ and $310_{1-n}$ are exemplary and pedal configuration 300 may rotate pedal 101 or portions of pedal 101 relative to one or more axes.

Pedal configuration 300 can counteract the efforts of the pedal to move a driver's foot. By rotation of the pedal surface, rather than moving the base of the pedal, a driver may be notified of pedal misstep. Rotational movement of a pedal 101 in peal configuration can direct a driver's foot to a direction. Embodiments described below provide configurations to slide, lift, or have a directional friction to direct the driver's foot in a direction.

Figure 4:
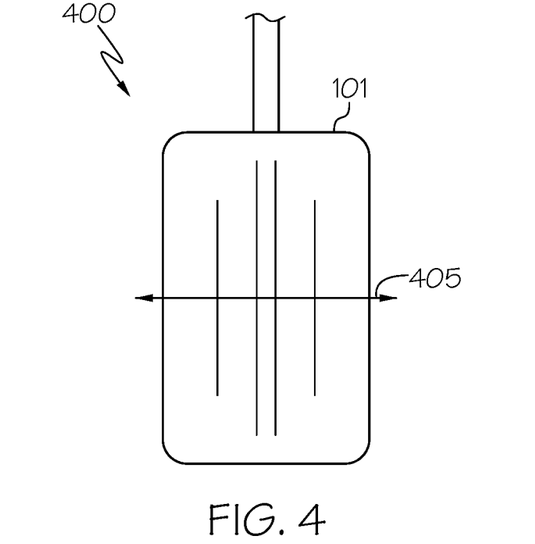
FIG. 4 depicts a pedal configured to oscillate, according to one or more embodiments described herein.

FIG. 4 depicts a pedal configuration 400 including a pedal 101 configured to oscillate. According to embodiments, instead of rotation, or in addition to, pedal movement may be lateral movement (i.e., to the side) as shown by direction 405. According to embodiments, pedal configuration includes one or more oscillators to provide symmetrical or asymmetrical vibrations. Oscillators of pedal configuration 400 may provide asymmetric (i.e., having different sliding speeds for the left and right directions) oscillations or vibrations that when activated can move a driver foot away from pedal 101. According to embodiments, pedal vibrations may be asymmetric to impart vibrations to shift a driver foot toward another pedal. Vibrations in direction 405 may be generated by at least one positioning element to vibrate a pedal pad and surface horizontally to reposition a driver foot. In certain embodiments, instead of vibration, pedal configuration 400 may be configured for oscillation having different rotation speeds for clockwise and counterclockwise pulsing to deliver information such as direction.

Figure 5:
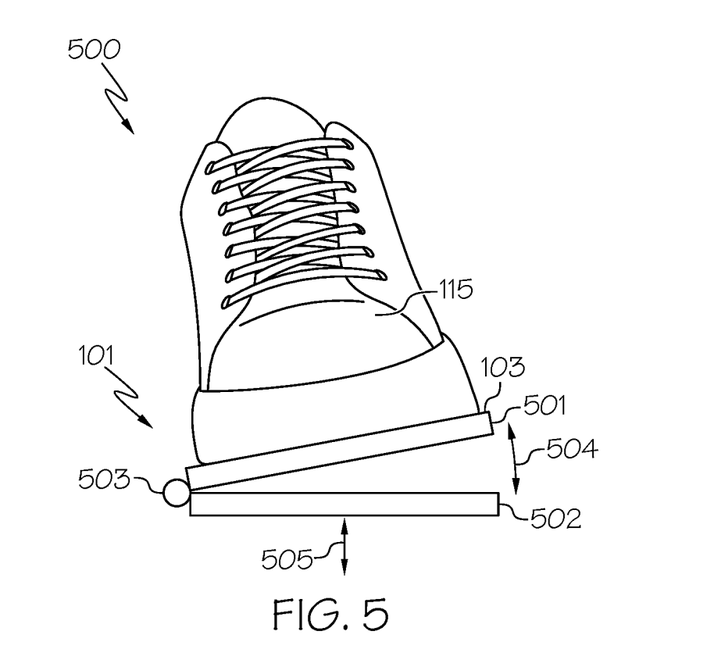
FIG. 5 depicts a pedal configuration having a flip plate, according to one or more embodiments described herein.
Figure 6:
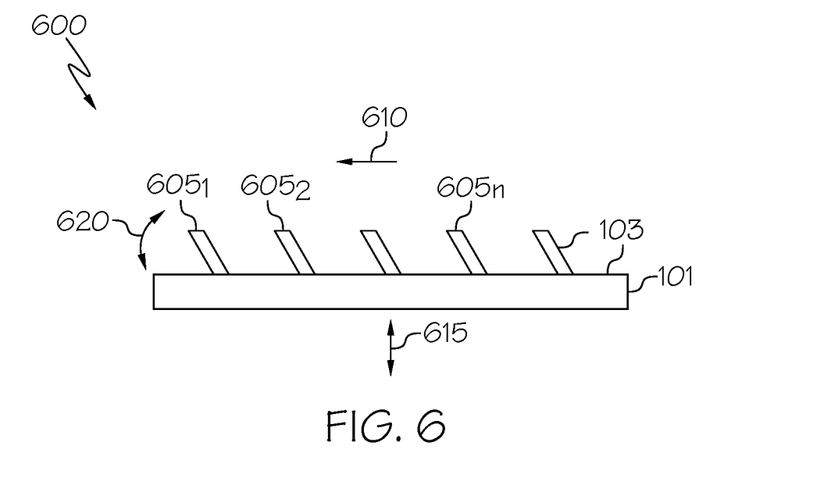
FIG. 6 depicts a pedal configuration having a direction friction surface, according to one or more embodiments described herein.

FIG. 5 depicts a pedal configuration 500 having a flip plate 501, according to embodiments described herein. Pedal configuration 500 illustrates pedal 110 including flip plate 501 and support 502. Flip plate 501 may be coupled to support 502 by joint 503. Joint 503 may be a hinge joint or joint in general configured to allow flip plate 501 rotate relative to a pivot axes associated with joint 503. According to one embodiment pedal 101 may be controller to generate vertical vibration, shown by direction 505, of support 502 to rotate flip plate 501 in direction 504. Flip plate 501 is shown in an elevated position in FIG. 5. When not activated flip plate 501 is in contact with support 502. Flip plate 501 and support 502 may form a pedal 101 having a configuration fixedly connected on one side.

FIG. 6 depicts a pedal configuration 600 having a direction friction surface according to embodiments described herein. According to embodiments pedal 101 may include a surface 103 configured to manipulate movement with a direction friction surface. Surface 103 may be configured to provide a directional friction that is stronger in one direction than the opposite direction other such that it may be easier to slide in one direction while harder to slide to the other. According to embodiments, surface 103 includes at least one of a coating and elements to allow for easier sliding in direction 610. According to embodiments, by vertically vibrating pedal 101 in direction 615, the foot on the pedal will be pushed towards the side having lesser friction and can be removed as shown by direction 620.

According to another embodiment, surface 103 of pedal 101 can include a plurality of projections $605_{1-n}$. Projections $605_{1-n}$ may be a plurality of raised ridges or raised projections. Pedal configuration 600 may include at least one source is configured to vibrate the plurality of projections $605_{1-n}$ to laterally displace a driver foot from the surface.

The source may impart vibrations to projections $605_{1-n}$ which shifts a driver foot with each pulse and results in shifting of the driver foot in direction 610.

Figure 7:
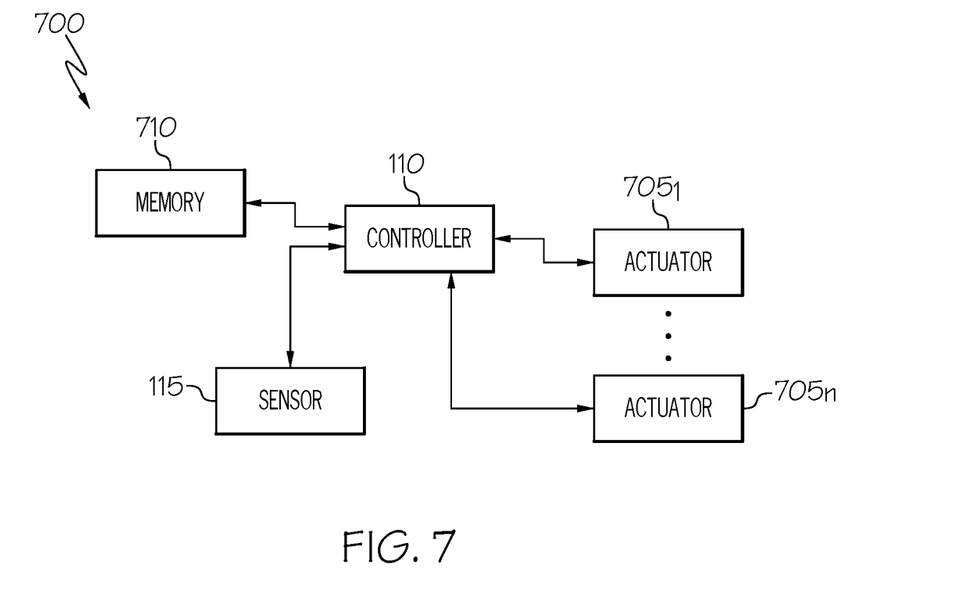
FIG. 7 depicts a control configuration for a pedal, according to one or more embodiments described herein.

FIG. 7 depicts an example control configuration 700 for a pedal, according to embodiments described herein. According to embodiments, a controller 110 is configured to control a positioning element when an operator action does not match vehicle action. Control configuration 700 may include sensor 115 to detect a driver foot relative to a pedal. Controller 110 may be configured to control a positioning element using output of sensor 115 to control and/or activate one or more actuators $705_{1-n}$.

Controller 110 may be coupled to memory 710, sensor 115 and actuators $705_{1-n}$. Controller 110 may be a processor or control device configured to execute one or more operations stored in memory 710, such as processes for controlling at least one positioning element of a pedal configuration. Controller may control at least one positioning element configured to adjust a pedal pad in response to pedal misstep using one or more of actuators $705_{1-n}$. Actuators $705_{1-n}$ may be controlled with one or more mechanical features of a pedal to allow for positioning of a driver foot relative to a surface of a pedal pad. Actuators $705_{1-n}$ may be controlled to activate at least one positioning element for one or more of rotation, vibration and positioning of a vehicle pedal. Controller 110 may be part of a vehicle system configured to control a positioning element of a pedal pad configuration described according to embodiments herein.

According to embodiments, controller 110 may be configured to control a vehicle pedal configuration and at least one positioning element configured to adjust the surface of the pedal pad in response to pedal misstep. By way of example controller 110 may be configured to control at least one positioning element of vehicle accelerator pedals using actuators $705_{1-n}$. Actuators $705_{1-n}$, for example, may be configured to control a pedal configuration including a pedal configured to apply a rotational movement to correct an improper foot placement, such as rotation of the pedal pad relative to a vertical axis which can include removal of a driver foot. Actuators may include one or more mechanical structurers configured to release a pedal pad. According to other embodiments. At least one of actuators $705_{1-n}$ may be configured to generate oscillations for lateral movement of the pedal. Actuators $705_{1-n}$ may control position of a flip plate, wherein one or more of actuators $705_{1-n}$ cause vibration of the pedal to rotate the flip plate about an axis to remove a driver foot. In yet other embodiments, actuators $705_{1-n}$ can control a pedal configuration including a direction friction surface, the direction friction surface allowing easier movement in one direction and more difficult movement in the opposite direction, wherein a foot may be moved by vibration of the pedal.

Systems and device configurations are provided for reducing miscommunication between the vehicle and the driver that results in applying the incorrect pedal. Embodiments include pedal configurations having a pedal pad and at least one positioning element configured to adjust a pedal pad in response to pedal missteps. Pedal adjustment can include rotation of a pedal pad, rotation of portions of pedal pad and multibody pedal pad configurations. According to some embodiments, a pedal pad can include vibrational elements to control vibration of a pedal pad. Embodiments are also directed to a pedal pad including a flip plate. Embodiments are also provided for a pedal pad including a directional friction surface, and direction protrusions for foot positioning. Systems are provided including a controller to control a pedal configuration and positioning element of a pedal pad.

The controller may control the pedal pad based on a driving mode, such as an assistive driving state wherein operator is instructed to apply a pedal.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for haptic array devices. It should also be understood that these embodiments are merely exemplary and are not intended to limit the scope of this disclosure.

What is claimed is:

1. A vehicle pedal configuration comprising:
    a pedal pad having a surface;
    at least one actuator movably coupled to the pedal pad;
    a controller configured to control the at least one actuator; and
    a sensor configured to detect a driver foot position on the surface of the pedal pad;
    wherein the controller is configured to monitor vehicle conditions and the driver foot position and determine based on the monitored vehicle conditions when the driver foot position is in contact with the surface of the pedal pad contrary to the vehicle conditions and in response, is configured to control the at least one actuator to adjust the surface of the pedal pad with movement in any manner toward a second pedal to urge the driver foot in a direction towards the second pedal.

2. The vehicle pedal configuration of claim 1, wherein at least a portion of the pedal pad is configured to rotate.

3. The vehicle pedal configuration of claim 1, wherein the pedal pad includes a multibody structure having a plurality of pad elements, wherein adjusting the pedal pad includes rotation of at least one of the plurality of pad elements.

4. The vehicle pedal configuration of claim 3, wherein rotation of the at least one of the plurality of pedal pad elements includes rotation in one of a vertical direction and a horizontal direction relative to a pedal arm.

5. The vehicle pedal configuration of claim 1, wherein the at least one actuator vibrates the pedal pad and the surface horizontally to reposition the driver foot.

6. The vehicle pedal configuration of claim 1, wherein the pedal pad includes a flip plate, wherein the flip plate rotates relative to a pivot axis.

7. The vehicle pedal configuration of claim 1, wherein the surface of the pedal pad includes a plurality of projections, and wherein the at least one actuator is configured to vibrate the plurality of projections to laterally displace the driver foot from the surface.

8. A vehicle system comprising:
    a pedal configuration including
        a pedal pad having a surface, and
        at least one actuator configured to adjust the surface of the pedal pad; and
    a sensor configured to detect a driver foot position on the pedal pad;
    a controller configured to control the at least one actuator, wherein the controller is configured to monitor vehicle conditions and the driver foot position and determine based on the monitored vehicle conditions, when the driver foot position is in contact with the pedal pad sensed by the sensor contrary to the vehicle conditions and in response is configured to control the at least one actuator to adjust the surface of the pedal pad with movement in any manner toward a different pedal to urge the driver foot in a direction towards the different pedal.

9. The vehicle system of claim 8, wherein the pedal is at least one of a vehicle accelerator pedal and a vehicle brake pedal.

10. The vehicle system of claim 8, wherein the pedal pad is configured to rotate.

11. The vehicle system of claim 8, wherein the pedal pad includes a multibody structure having a plurality of pad elements, wherein adjusting the pedal pad includes rotation of at least one of the plurality of pad elements.

12. The vehicle system of claim 11, wherein rotation of the at least one of the plurality of pedal pad elements includes rotation in one of a vertical and a horizontal direction relative to a pedal arm.

13. The vehicle system of claim 8, wherein the at least one actuator vibrates the pedal pad and the surface horizontally to reposition the driver foot.

14. The vehicle system of claim 8, wherein the pedal pad includes a flip plate, wherein the flip plate rotates relative to a pivot axis.

15. The vehicle system of claim 8, wherein the surface of the pedal pad includes a plurality of projections, and wherein the at least one actuator is configured to vibrate the plurality of projections to laterally displace the driver foot from the surface.

* * * * *